United States Patent
Rall

(10) Patent No.: US 6,908,086 B2
(45) Date of Patent: Jun. 21, 2005

(54) CHUCK

(75) Inventor: Gerhard Rall, Marbach (DE)

(73) Assignee: Hainbuch GmbH Spannende Technik, Marbach (DE)

( * ) Notice: Subject to any disclaimer, the term of this patent is extended or adjusted under 35 U.S.C. 154(b) by 97 days.

(21) Appl. No.: 10/432,331

(22) PCT Filed: Nov. 22, 2001

(86) PCT No.: PCT/EP01/13572

§ 371 (c)(1),
(2), (4) Date: May 22, 2003

(87) PCT Pub. No.: WO02/42025

PCT Pub. Date: May 30, 2002

(65) Prior Publication Data

US 2004/0051257 A1 Mar. 18, 2004

(30) Foreign Application Priority Data

Nov. 22, 2000 (DE) .......................... 100 57 977

(51) Int. Cl.$^7$ ............................................. B23B 31/20
(52) U.S. Cl. ..................................... 279/43.7; 279/46.7
(58) Field of Search ............................ 279/43.7, 43.8, 279/43.9, 46.7, 46.8, 46.9, 51, 52, 58

(56) References Cited

U.S. PATENT DOCUMENTS

| | | | | | |
|---|---|---|---|---|---|
| 1,403,415 A | * | 1/1922 | Iggberg | ........................ | 279/60 |
| 2,245,316 A | * | 6/1941 | Amsler | ........................ | 73/859 |
| 4,856,797 A | * | 8/1989 | Rall | ........................ | 279/46.7 |
| 5,160,150 A | * | 11/1992 | Schmidt | ........................ | 279/58 |
| 5,788,249 A | * | 8/1998 | Tagami | ........................ | 279/51 |
| 5,911,421 A | * | 6/1999 | Steele | ........................ | 279/46.9 |
| 6,726,221 B2 | * | 4/2004 | Terwilliger et al. | ........... | 279/50 |
| 6,746,023 B2 | * | 6/2004 | Komine | ..................... | 279/46.7 |

FOREIGN PATENT DOCUMENTS

| | | |
|---|---|---|
| DE | 928 862 | 6/1955 |
| DE | 198 53 525 A1 | 5/2000 |
| GB | 482766 | 4/1938 |

* cited by examiner

Primary Examiner—Daniel W. Howell
Assistant Examiner—Michael W. Talbot
(74) Attorney, Agent, or Firm—Foley & Lardner LLP

(57) ABSTRACT

The chuck (10) is comprised of a chuck body (11) having an inner cone surface and a grip head (12) with a corresponding outer cone surface. The grip head (12) is subdivided into individual clamping jaws (21) by several seperating slots, said clamping jaws being connected to the grip head (12) by means of elastic connecting elements (22). Recesses (25) are provided on the inner cone surface of the chuck body (11) at least in the peripheral area of each seperating slot of the grip head (12), preferably also in the peripheral area of the apex line of each clamping jaw (21). Said recesses (25) have peripheral extension which is greater than that of the separating slots of the grip head (12) or the apex region of the clamping jaws (21). The axial extension of the recesses (25) is at least identical to the largest overlap area of both cone surfaces. The recesses (25) are filled with a filling body (27), made of an elastic, compressible material, up to the imaginary inner cone surface. The filling bodies (27) are permanently connected to the chuck body (11).

13 Claims, 3 Drawing Sheets

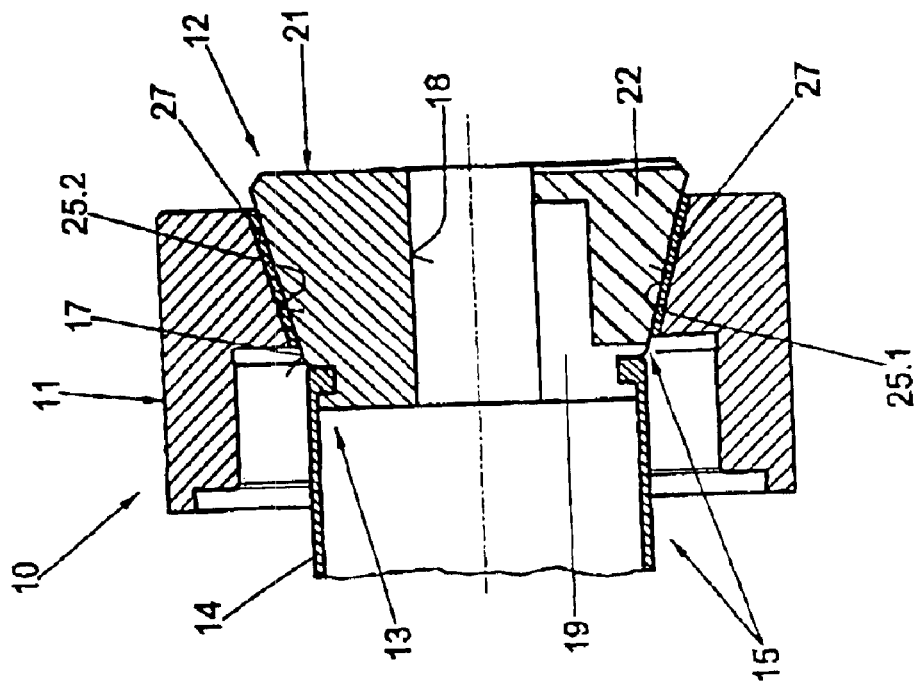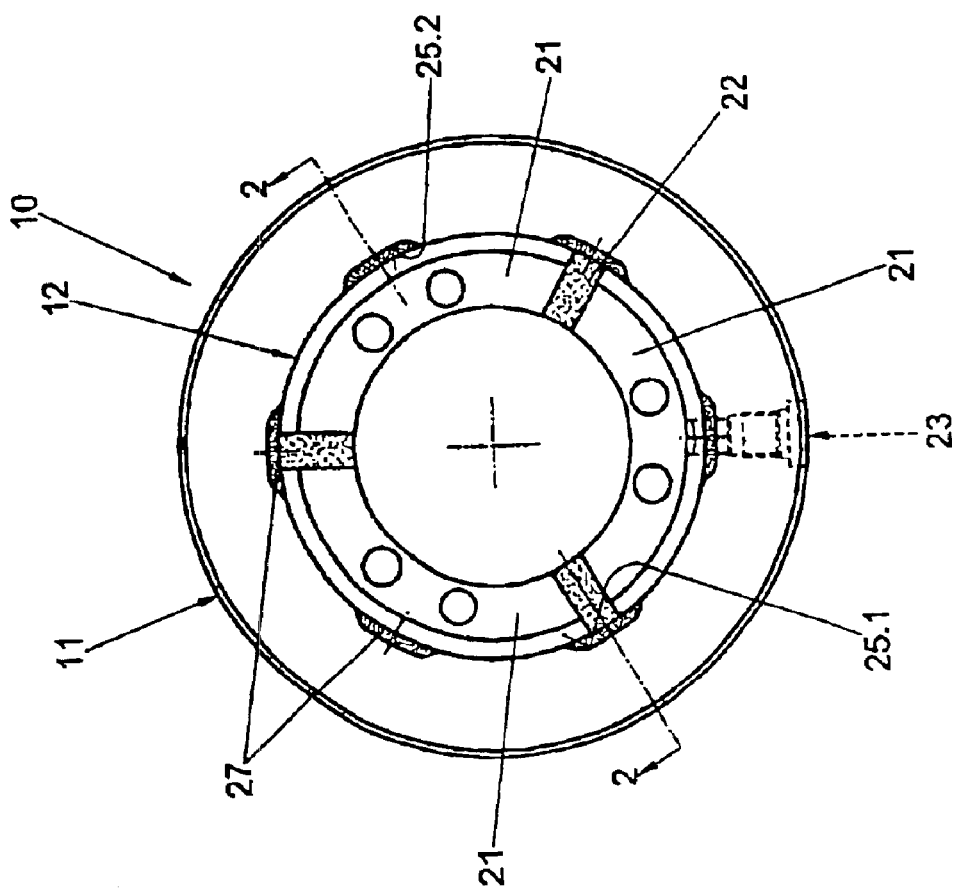

CHUCK

Chucks have a chuck body which is connected to the main spindle of a lathe. The chuck body has an internal cone surface. Interacting with the latter is a collet or a collet head, this collet or collet head having an external cone surface which is matched to the internal cone surface of the chuck body. The following comments are directed toward the collet head, in short called the chucking head, although they also apply to collets at least in a corresponding manner.

The chucking head is hollow and has on its inside chucking surfaces which are matched to the shape and dimensions of the workpieces. The chucking head is subdivided by axially and radially continuous separating slots into a number of chuck jaws which are combined with one another by elastic connecting elements to form the chucking head.

There is an anti-rotation locking means which acts between the chuck body and the chucking head and whose part assigned to the chucking head is arranged in the plane of symmetry of one of the chuck jaws.

The internal cone surface of the chuck body and the external cone surface of the chuck jaws only bear fully against one another when the workpiece clamped in the chucking head has a nominal diameter. In the event of deviations from the nominal size, the chucking head is drawn to a greater or lesser extent into the chuck body during the chucking operation. The chuck jaws then bear against the internal cone surface of the chuck body either only along their outer longitudinal edges or only along their apex region. This leads to high surface pressures and correspondingly large abrasion in particular during the chucking operation.

There is also the fact that the longitudinal edges of the chuck jaws may be damaged when the separating slots are being produced or that the longitudinal edges may be deformed when the chucking head is being handled, so that the chuck jaws no longer bear satisfactorily against the internal cone surface of the chuck body in the region of their longitudinal edges.

In order to diminish these disadvantages, it is known to remove some material in the region of the longitudinal edges and in the region of the apex line of the chuck jaws, so that these surface regions are correspondingly hollow in the nominal state. This in turn results in the disadvantage that dirt may penetrate at these hollow locations and impair the seating of the chuck jaws in the chuck body.

The object of the invention is to design chucks in such a way that the mutual contact of the chuck jaws and the chuck body is improved and the wear of the parts is thereby reduced.

This object is achieved by chucks having the features of claim 1.

Owing to the fact that there is a recess on the internal cone surface of the chuck body in the circumferential region of each separating slot of the chucking head, the circumferential extent of which recesses is greater than that of the separating slot and the axial extent of which recesses is at least equal to the greatest axial overlap distance of the two cone surfaces, the longitudinal edges of the chuck jaws no longer come into contact with the internal cone surface of the chuck body even if the longitudinal edges have not been reworked or if they have only been partially reworked or if they have been damaged during the handling of the chucking head and have been deformed beyond the theoretical external cone surface. As a result, damage and also increased wear of the internal cone surface of the chuck are avoided and the chucking accuracy of the chuck is maintained for a longer period.

In addition, the arrangement of the recesses on the internal cone surface has the great advantage that the machining effort for improving the mutual contact is very greatly reduced overall, since the recesses are only provided on the chuck body and they no longer have to be provided on the chucking heads, which are required in considerably greater number on account of the diverse workpieces.

By a configuration of the chuck as claimed in claim 2, the mutual contact between chuck and chucking head is also improved in the region of the apex line of the chuck jaws, since the contact is distributed over two surface regions on both sides of the apex line.

By a configuration of the chuck as claimed in claim 3, the chuck is again given a continuously smooth internal surface, so that there are no gaps between the chuck body and the chucking head, through which gaps dirt could pass between the two parts.

On account of the resilience of the filling bodies, irregularities which are present in particular in the region of the longitudinal edges of the chuck jaws and project outward can be absorbed without disturbing the good mutual contact of the remaining surface regions of the chuck jaws and of the chuck body. This applies in particular when the material of the filling bodies is at the same time also compressible.

In a configuration of the chuck as claimed in claim 4, sharp edges are avoided at the transition between a recess and the adjacent surface regions of the internal cone surface, which sharp edges could press into the surface of the chuck jaws and as a result could impair the good mutual contact of the two parts.

The invention is explained in more detail below with reference to an exemplary embodiment shown in the drawing, in which:

FIG. 1 shows a simplified end view of a chuck;

FIG. 2 shows a longitudinal section of the chuck along section line 2—2 in FIG. 1;

Figure 4:
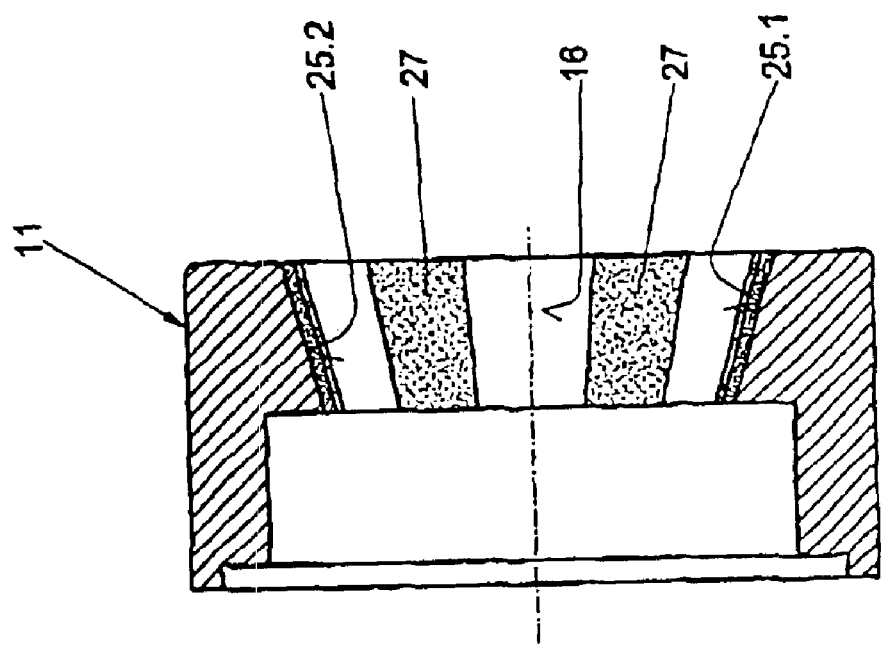
FIG. 4 shows a longitudinal section of the chuck body in accordance with FIG. 2.

The chuck 10 has a chuck body 11 and a chucking head 12. The chuck 11 is connected to the main spindle (not shown) of a lathe. Via a coupling device 13, the chucking head 12 is coupled to a chucking tube 14, together with which it forms a divisible collet 15.

Figure 3:
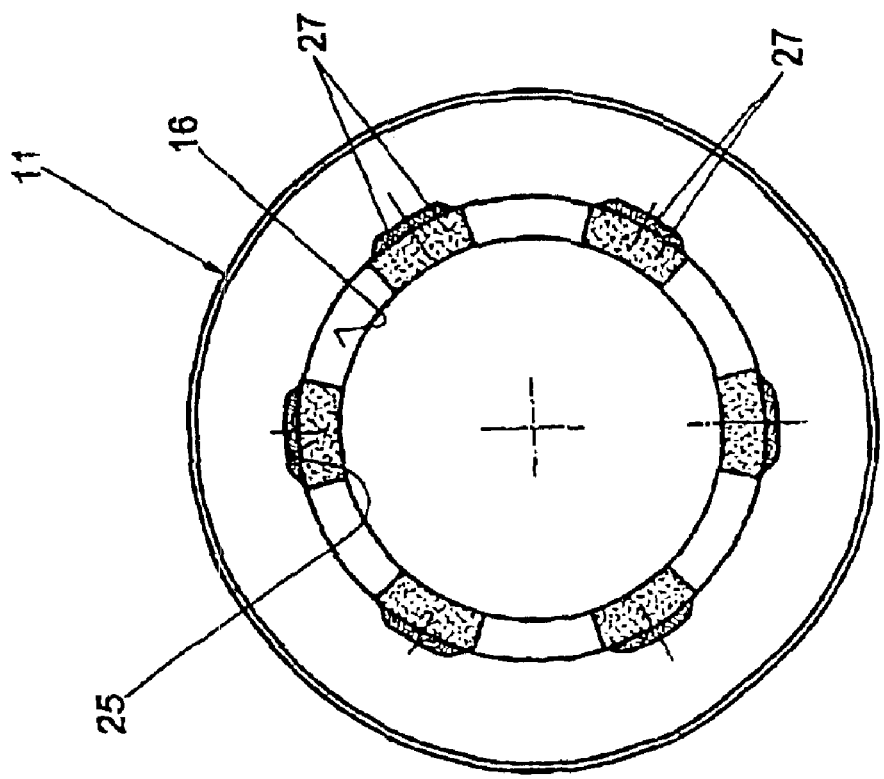
FIG. 3 shows a simplified end view solely of the chuck body according to FIG. 1.

On its inside, the chuck body 11 has an internal cone surface 16 (FIG. 3 and FIG. 4). On its outside, the chucking head 12 has an external cone surface 17 (FIG. 2), which is matched to the internal cone surface 16 of the chuck body 11. The chucking head 12 is hollow and has on its inside a chucking surface 18 which is matched to the outside of the workpieces to be machined.

The chucking head 12 is subdivided into individual chuck jaws 21 by axially and radially continuous separating slots 19. There are three chuck jaws 21 in the chucking head 12. The chuck jaws 21 are combined with one another by elastic connecting elements 22 to form the chucking head 12.

There is an anti-rotation locking means 23 which acts between the chuck body 11 and the chucking head 12. Its part assigned to the chucking head 12 is arranged in the plane of symmetry of one of the chuck jaws 21.

As can be seen from FIG. 1 and FIG. 3, there are a plurality of recesses 25 on the internal cone surface 16 of the chuck body 11. They may be assigned to two groups.

The recesses 25.1 of one group are in each case arranged in the circumferential region of each separating slot 19 of the chucking head 12. They are identical to one another. Their circumferential extent is greater than that of the separating slots 19. Their axial extent is generally at least equal to the greatest axial overlap distance of the two cone surfaces 16 and 17. In the exemplary embodiment shown, this means that the axial extent of the recesses 25.1 is equal to the axial extent of the internal cone surface 16. The recesses 25.1 are arranged symmetrically to the associated separating slot 19 of the chucking head 12.

The recesses 25.2 of the other group are in each case arranged in the circumferential region of the apex line of the chuck jaws 21. They are designed to be identical to one another. They have a certain circumferential extent, which depends, inter alia, on the curvature of the internal cone surface. In the case of the recesses 25.2, too, the axial extent is at least equal to the greatest axial overlap distance of the two cone surfaces 16 and 17. The recesses 25.2 are arranged symmetrically to the apex line of the chuck jaws 21.

In the case of the recesses 25, the nature and the dimensions of their boundary surface depend, inter alia, on the curvature of the internal cone surface 16 and on whether they are arranged as recesses 25.1 in the region of one of the separating slots 19 or as recesses 25.2 in the region of the apex line of one of the chuck jaws 21. In the case of the recesses 25.1, the circumferential extent also depends on the width of the separating slots 19.

Depending on the conditions described, the boundary surface may be a uniformly curved surface and may be designed, for example, as a segment of the lateral surface of a circular cylinder or of a truncated cone. In the region of the separating slots 19, in particular in the case of relatively wide separating slots, the boundary surface is usually designed as an equidistant from the internal cone surface 16.

There is a transition surface in the transition region between a segment of the internal cone surface 16 and the boundary surface of the adjacent recess 25. As viewed in the direction of the lateral surface lines of the internal cone surface, the elevation line of the transition surface may be formed either by a straight line or a polyline or also by a continuous curve.

Figure 5:
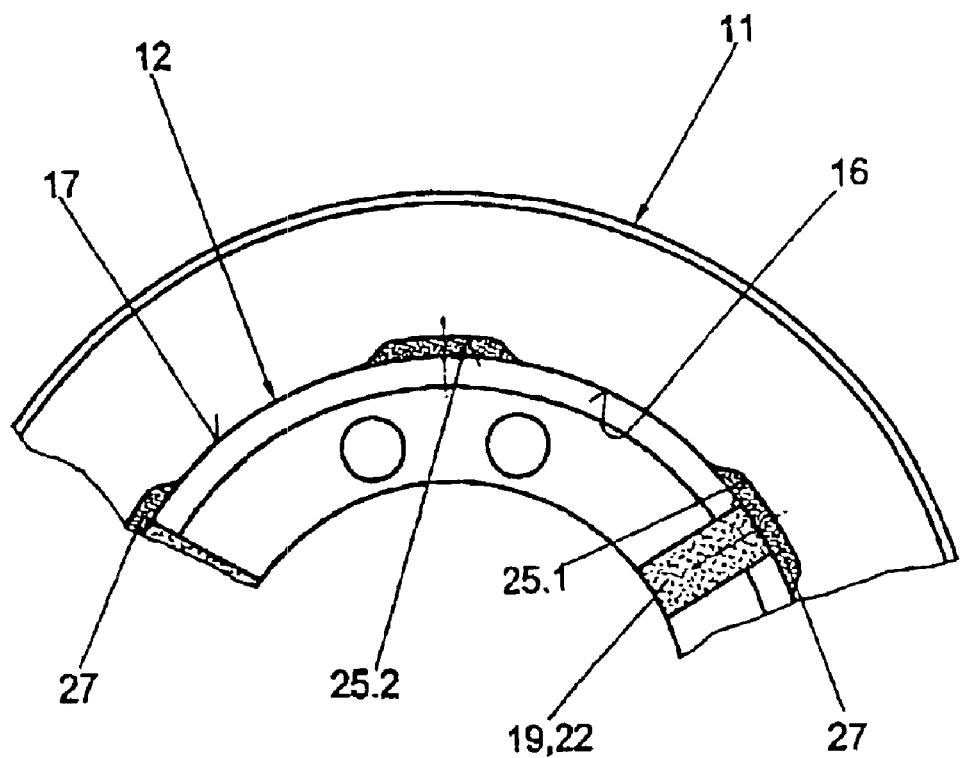
FIG. 5 shows an enlarged detail from FIG. 1.
Figure 6:
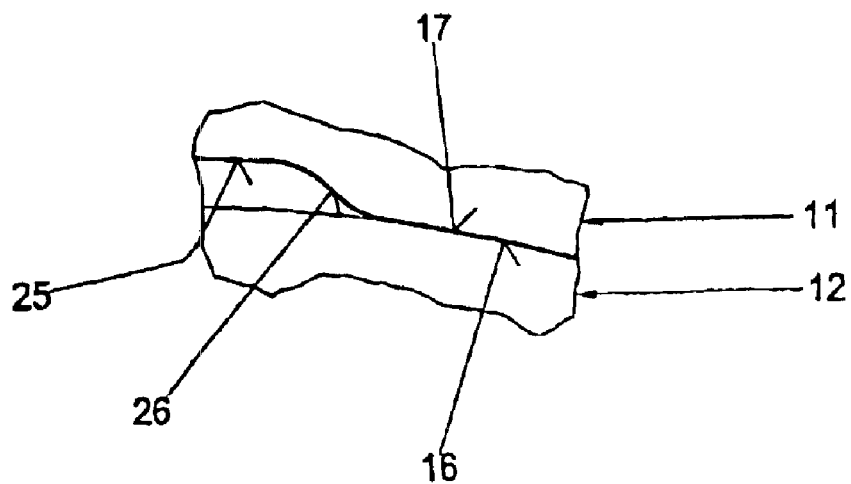
FIG. 6 shows a schematic enlarged detail of the end. view according to FIG. 5.

In the end views according to FIG. 1, FIG. 3 and FIG. 5, the recesses 25 are all shown the same for the sake of simplicity. Their boundary surface, at least in the center circumferential region, is an equidistant from the internal cone surface 16, adjoining which is one transition surface 26 each (FIG. 6). Its elevation line is a continuous curve, which is first curved convexly and then concavely. It is advantageous if the transition surface 26 merges tangentially into the internal cone surface 16, so that no sharp edge is produced there, which could press into the external cone surface 17 of the chuck jaws 21.

The recesses 25 are filled up to the imaginary internal cone surface with a filling body 27. The filling bodies 27 are made of an elastic material which is at the same time also compressible, so that any possible irregularities of the longitudinal edges of the chuck jaws 21 can be absorbed in them. The filling bodies 27 are permanently connected to the chuck body and are expediently integrally formed directly on it.

List of Designations

10 Chuck
11 Chuck body
12 Chucking head
13 Coupling device
14 Chucking tube
15 Collet
16 Internal cone surface
17 External cone surface
18 Chucking surface
19 Separating slots
21 Chuck jaws
22 Connecting elements
23 Anti-rotation locking means
25 Recesses
26 Transition surface
27 Filling body

What is claimed is:

1. A chuck comprising:
   a chuck body and a chucking head,
   wherein the chuck body has an internal cone surface,
   wherein the chucking head has an external cone surface which is matched to the internal cone surface of the chuck body, and
   wherein the chucking head is subdivided by axially and radially continuous separating slots into a number of chuck jaws which are combined with one another by elastic connecting elements,
   an anti-rotation locking means, which acts between the chuck body and the chucking head and whose part assigned to the chucking head is arranged in the plane of symmetry of one of the chuck jaws, the anti-rotation locking means comprising:
   one recess each on the internal cone surface of the chuck body in the circumferential region of each separating slot of the chucking head,
   wherein the recesses are at least approximately identical to one another,
   wherein the circumferential extent of the recesses is greater than that of the separating slot,
   wherein the axial extent of the recesses is at least equal to the greatest axial overlap distance of the two cone surfaces and
   wherein the recess is arranged symmetrically to the separating slot.

2. The chuck as claimed in claim 1,
   wherein there is one recess each on the internal cone surface of the chuck body in the circumferential region of the apex line of each chuck jaw of the chucking head,
   wherein the recesses are at least approximately identical to one another,
   wherein each recess has a certain circumferential extent,
   wherein the axial extent of each recess is at least equal to the greatest axial overlap distance of the two cone surfaces and
   wherein each recess is arranged symmetrically to the apex line of the chuck jaw.

3. The chuck as claimed in claim 1,
   wherein the recesses are filled up to the imaginary internal cone surface with a filling body,
   wherein the body made of an elastic and at the same time compressible material and
   wherein the filling body is permanently connected to the chuck body.

4. The chuck as claimed in claim 1,
   wherein the boundary surface of the recesses, at least in its center circumferential region, is equidistant from the internal cone surface,
   wherein the internal cone surface is formed by a segment of a lateral cylinder surface or is formed by a segment of a lateral cone surface.

5. The chuck as claimed in of claim 1,
wherein the boundary surface of the recesses is formed
by a segment of a lateral cylinder surface, or a lateral circular-cylinder surface, or
by a segment of a lateral cone surface, the axis of which is in alignment with the taper point of the internal cone surface.

6. The chuck as claimed in claim 1,
wherein there is a transition surface in the transition region between a segment of the internal cone surface and the boundary surface of the adjacent recess,
wherein the elevation line of the transition surface is formed either
(i) by a straight line or by a polyline, or
(ii) by a continuous curve, wherein if the elevation line of the transition surface is designed as a continuous curve, the continuous curve merges tangentially into the elevation line of the internal cone surface.

7. The chuck as claimed in claim 2,
wherein the recesses are filled up to the imaginary internal cone surface with a filling body,
wherein the filling body is made of an elastic and at the same time compressible material and
wherein the filling body is permanently connected to the chuck body.

8. The chuck as claimed in claim 2,
wherein the boundary surface of the recesses, at least in its center circumferential region, is equidistant from the internal cone surface,
wherein the internal cone surface is formed by a segment of a lateral cylinder surface or by a segment of a lateral cone surface.

9. The chuck as claimed in claim 3,
wherein the boundary surface of the recesses, at least in its center circumferential region, is equidistant from the internal cone surface,
wherein the internal cone surface is formed by a segment of a lateral cylinder surface or by a segment of a lateral cone surface.

10. The chuck as claimed in claim 2,
wherein the boundary surface of the recesses is formed
by a segment of a lateral cylinder surface, or a lateral circular-cylinder surface, or
by a segment of a lateral cone surface, the axis of which is in alignment with the taper point of the internal cone surface.

11. The chuck as claimed in claim 3,
wherein the boundary surface of the recesses is formed
by a segment of a lateral cylinder surface, or a lateral circular-cylinder surface, or
by a segment of a lateral cone surface, the axis of which is in alignment with the taper point of the internal cone surface.

12. The chuck as claimed in claim 2,
wherein there is a transition surface in the transition region between a segment of the internal cone surface and the boundary surface of the adjacent recess,
wherein the elevation line of the transition surface is formed either
(i) by a straight line or by a polyline, or
(ii) by a continuous curve, wherein if the elevation line of the transition surface is designed as a continuous curve, the continuous curve merges tangentially into the elevation line of the internal cone surface.

13. A chuck comprising:
a chuck body and a chucking head,
wherein the chuck body has an internal cone surface,
wherein the chucking head has an external cone surface which is matched to the internal cone surface of the chuck body, and
wherein the chucking head is subdivided by axially and radially continuous separating slots into a number of chuck jaws which are combined with one another by elastic connecting elements,
an anti-rotation lock which comprises:
one recess each on the internal cone surface of the chuck body in the circumferential region of each separating slot of the chucking head,
wherein the recesses are at least approximately identical to one another,
wherein the circumferential extent of the recesses is greater than that of the separating slot,
wherein the axial extent of the recesses is at least equal to the greatest axial overlap distance of the two cone surfaces and
wherein each recess is arranged symmetrically with respect to the separating slot.

* * * * *